Figure 1:
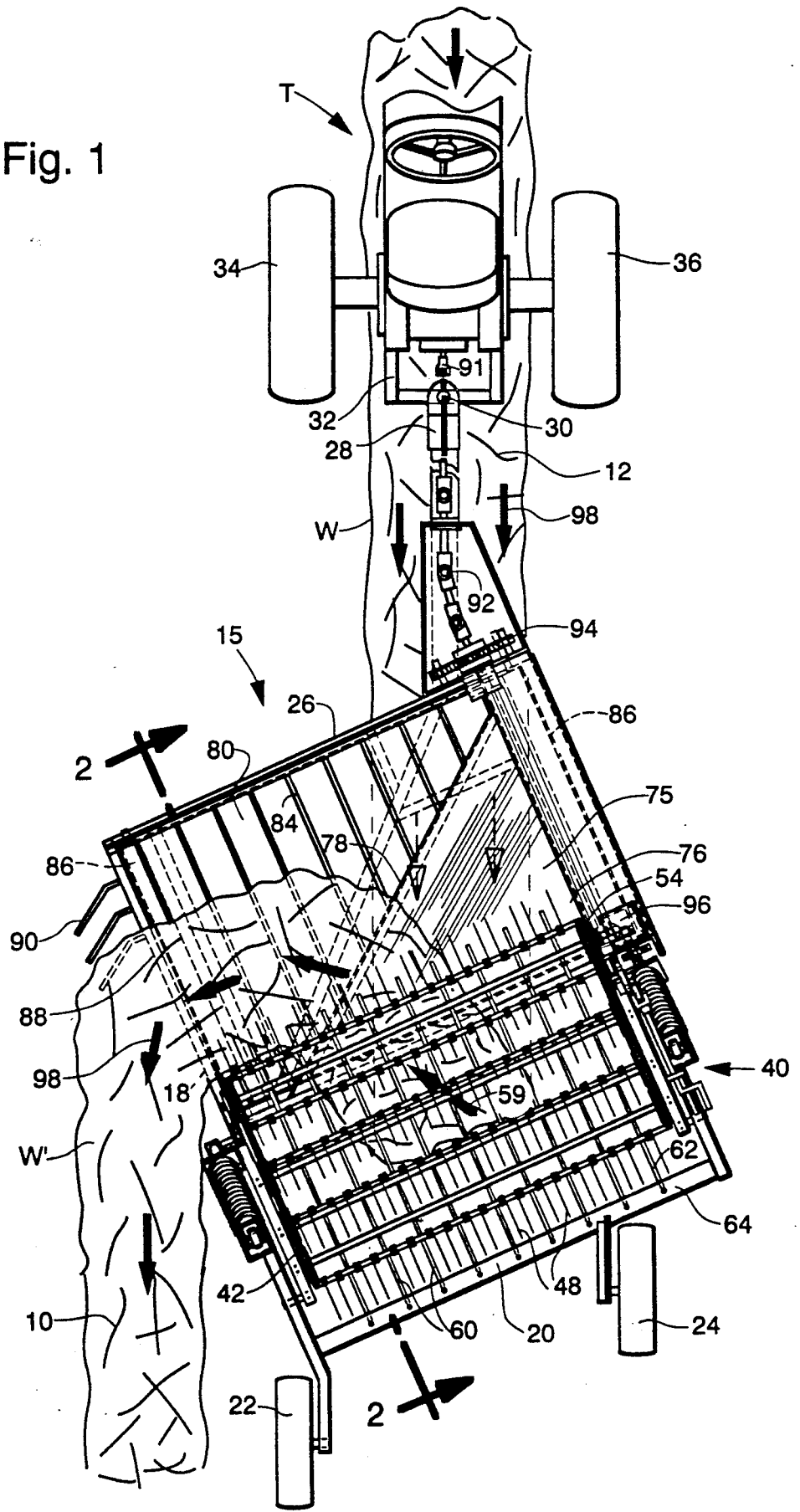

United States Patent [19]

Underhill et al.

[11] Patent Number: 5,175,987
[45] Date of Patent: Jan. 5, 1993

[54] HAY HARVESTING MACHINE

[75] Inventors: Kenneth R. Underhill, Strasburg; Jacob M. Fisher, Gordonville, both of Pa.

[73] Assignee: Pequea Machine Inc., Gordonville, Pa.

[21] Appl. No.: 789,033

[22] Filed: Nov. 7, 1991

[51] Int. Cl.⁵ .................. A01D 78/06; A01D 84/00
[52] U.S. Cl. ........................ 56/372; 56/366; 56/DIG. 21
[58] Field of Search .......... 56/366, 370, 372, DIG. 21

[56] References Cited

U.S. PATENT DOCUMENTS

| | | | |
|---|---|---|---|
| 3,387,445 | 6/1968 | Reinhardt et al. | 56/370 |
| 3,570,231 | 3/1971 | McCary et al. | 56/370 |
| 4,403,468 | 9/1983 | Yoder | 56/370 |
| 4,730,447 | 3/1988 | Fisher et al. | 56/366 X |
| 4,738,092 | 4/1988 | Jennings | 56/372 |
| 4,768,333 | 9/1988 | Reber | 56/366 X |
| 4,777,788 | 10/1988 | Laquerre | 56/366 X |
| 4,809,490 | 3/1989 | Swanson | 56/372 X |

Primary Examiner—Stephen J. Novosad
Attorney, Agent, or Firm—Hartman Underhill & Brubaker

[57] ABSTRACT

A hay harvesting machine in which previously cut crop material in a windrow or swath on the ground is picked up and inverted to position a damp side up and a dry side down; as the crop is inverted, it is directed laterally toward one side of the machine and rearwardly; after inversion, the crop is turned further and conveyed for discharge back onto the ground laterally displaced from its original position on the ground.

23 Claims, 2 Drawing Sheets

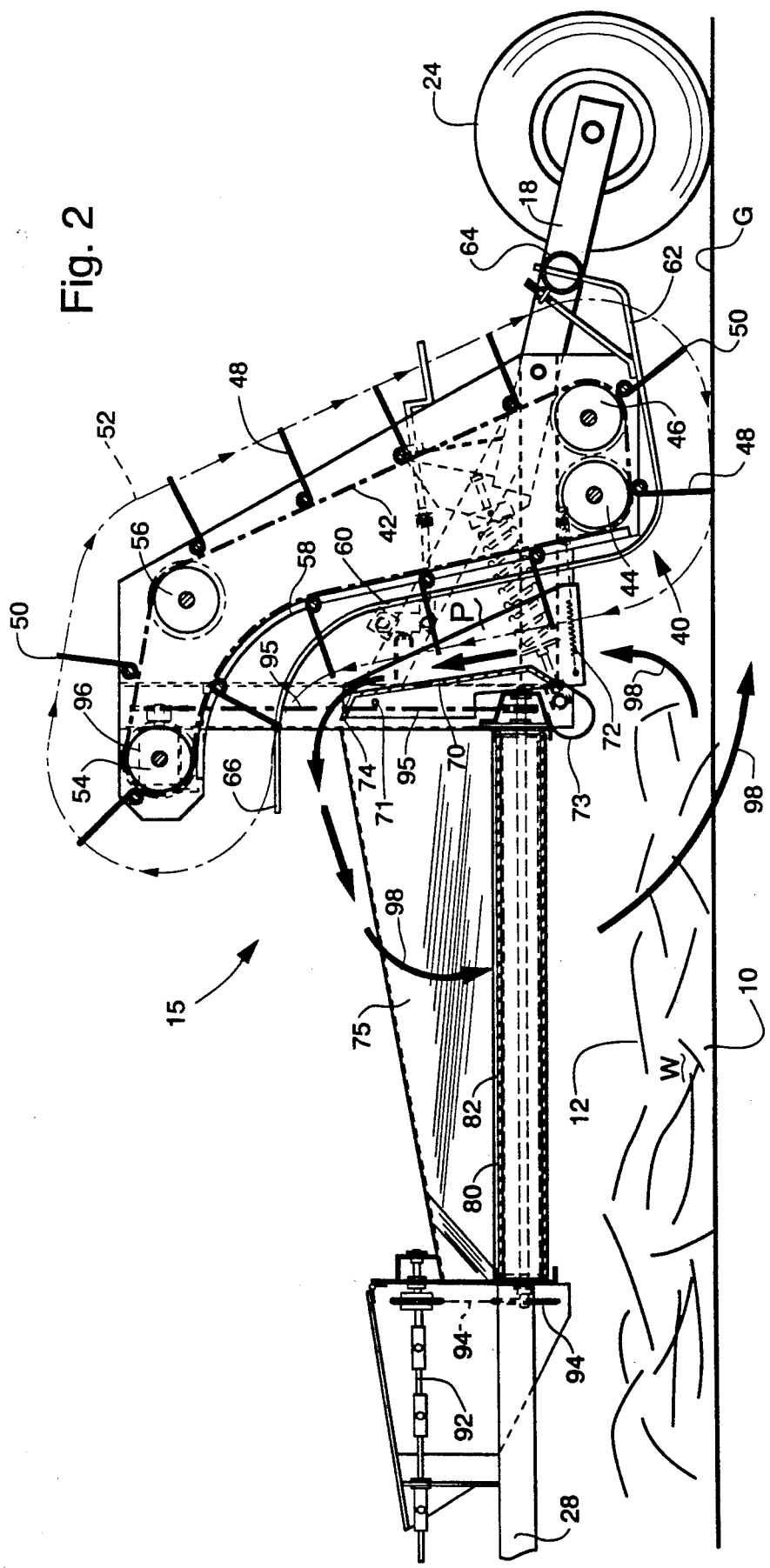

HAY HARVESTING MACHINE

FIELD OF INVENTION

This invention relates to an agricultural implement to pick up previously cut crop material on a field, invert it, and place the inverted crop back on the ground.

BACKGROUND OF INVENTION

When hay is harvested, the standing crop material is cut and deposited on the stubble on the ground in a windrow or swath. Drying is required to lower the moisture content of the crop material to a point where the hay may be picked up and baled or otherwise removed from the field for storage.

When the cut crop is laying in the field, the upper portion of the crop being exposed to the sun and air dries before the bottom portion adjacent the ground. If the farmer waits until the bottom is suitably dry, the upper portion of the crop may be too dry or damaged by rain, in which case leaves may be lost in subsequent harvesting. The leaves contain much of the food value of the hay and need to be preserved. If the leaves become too dry, some will drop off during harvest.

To facilitate drying, hay conditioners have been provided to crush or crack the stems of the crop after the crop is mowed. This may be done with separate machines or combination mower conditioners. Depending on the crop and geography, the crop may be windrowed after cutting and conditioning or the crop may be placed in a swath. This is sometimes dictated by the weather forecast.

When circumstances arise where the crop may become too dry on top and too damp on the bottom, such as occurs if the crop is rained on after cutting, it is desirable to turn over the crop so that the damp side is up and the dry side is down. Also, it is desirable to shift the crop from a damp location in one windrow to dry ground in an adjacent location.

For turning over crop material, whether the crop is in a windrow or swath, rakes, tedders and the like have been provided. Also, crop inverter machines have been developed to turn a crop over to facilitate drying and provide a crop uniformly dry for harvesting.

An inverter machine needs to be so operative that it handles the crop gently and does not knock off leaves in the inverting process. Further, the inverted crop needs to be deposited back on the ground in a uniform, fluffy manner to provide for faster drying. Also, the crop needs to be deposited back on the ground in a manner conducive to subsequent harvesting operations.

SUMMARY OF INVENTION

One object of this invention is to provide a hay harvesting machine which will pick up and invert a windrow or swath of previously cut crop material, invert the crop to position a damp side up and a dry side down and then carry the inverted crop to one side of the machine and deposit it back on the ground laterally displaced from its original position while maintaining the damp side up.

Another object of this invention is to provide a hay harvesting machine which will pick up crop material more completely than prior machines, elevate and then invert the crop and after it is inverted move the crop toward one side of the machine for deposit back on the ground in a manner which will gently handle the crop with less leaf loss than crop inverter machines of prior design.

Another object of this invention is to provide a machine of the type described having components so arranged that after the crop is inverted with a damp side up it is handled within the machine in a manner to maintain the damp side up and not allow the crop to turn over where the material would again have its damp side down.

Another object of this invention is to provide a hay inverter machine in which an endless chain conveyor is employed having tines so located and having a direction of travel which will provide a better pick up of the hay from the ground with less hay being missed and without damaging the crop to be handled.

A further object of this invention is to provide means which will pick up, elevate and invert a previously cut crop and adapt to variations in the quantity and density of the crop being handled.

A further object of this invention is to provide a cross conveyor which receives the inverted crop and directs the material laterally toward one side of the direction of travel of the machine and rearwardly to facilitate the redeposit of the crop material back on the ground, damp side up and displaced to one side from the location from which the crop was previously picked up.

A still further object of this invention is to provide a hay inverter machine having a pick up, elevating and inverting means and a cross conveyor cooperative with each other, both extending transversely relative to the direction of travel of the machine and having similar operative widths whereby the overall width of the machine is narrower than inverter machines of prior design; also it allows a wider pick-up design, without having a wider machine.

Other objects of this invention will be apparent from the following description, drawings and claims.

DRAWINGS

In the drawings:

FIG. 1 is a plan view of the hay harvesting machine of this invention being pulled by a tractor in a direction from the bottom to the top of the figure and showing a windrow of hay in front of the machine and inverted crop material discharged rearwardly and along one side of the machine; and FIG. 2 is a vertical section taken on the line 2—2 of FIG. 1 looking in the direction of the arrows and showing the endless chain pick up conveyor, the means which carries the crop material to be guided, inverted and then conveyed laterally for discharge back onto the ground.

DESCRIPTION

Referring now to the drawings by numerals of reference, W (FIG. 1) denotes generally a windrow of previously cut crop material resting on the ground G (FIG. 2) with a damp side 10 down and a dry side 12 up. To lift the windrowed crop from the ground, invert it so that the damp side 10 is up and the dry side 12 is down and to discharge the inverted crop back on the ground in a location laterally spaced from the position of the original windrow, an inverter machine 15 is provided constructed according to this invention.

The machine 15 has a frame 18 supported at a rearward end 20 by laterally spaced ground wheels 22 and 24. Frame 18 has a forward end 26 provided with a hitch 28 connected by a pin 30 to a draw bar 32 of a tractor generally indicated at T. The tractor may be of any conventional type. The one illustrated in FIG. 1 has wheels 34 and 36 which roll over the ground on opposite sides respectively of the windrow W in a forward direction from the bottom and toward the top of FIG. 1.

Mounted toward the rear 20 of frame 18 is pick up conveyor means 40 comprising an endless chain conveyor 42 which travels around pairs of lower idlers at opposite sides of the machine including forward idlers 44 and rearward idlers 46. The idlers are best shown in FIG. 2. Conveyor 42 has a series of rake tines 48 spaced from each other and the tips 50 of which travel generally along the dotted arrow line 52.

Conveyor 42 extends in a vertical direction from the bottom idlers 44 and 46 to forwardly located sprockets 54 and rearwardly positioned idlers 56. Tracks 58 establish the path of tines 48 as they move from idlers 44 to idlers 54.

The idlers 44 and 46 are so located relative to the ground G, that the tips of the tines 48 are directed to move downwardly around idlers 46 than forwardly close to the ground and then upwardly as they travel around idlers 44. With this design, a horizontal component of travel is provided which enables a cleaner sweep and pick up of the windrow crop material from the ground. The tines travel at a speed greater than the ground speed of the machine.

As shown in FIG. 1, pick up conveyor 40 is positioned and operates diagonally relative to the tractor T. The angular displacement as shown in the drawing is about thirty degrees relative to the direction of travel of the machine. An angular displacement generally in the range of twenty-five to thirty-five degrees has been found to be appropriate. Being so diagonally located, the tines 48 on the conveyor 42 travel in orbital paths which cause the picked up crop material to move laterally toward the left side of the machine as the crop is being elevated. This is the first shifting of the windrowed crop toward one side of the machine during the inverting process. See arrow 59 in FIG. 1.

In addition to lateral conveyance, the travel of the tines diagonally, and with the horizontal component provided by the bottom idlers 44 and 46, there is a cleaner and more complete pick up of the crop from the field.

As the windrow W is elevated from the ground G, the crop material travels through a passageway P (FIG. 2) formed by side-by-side guide rods 60 having rearward ends 62 which project through and are securely fastened to a cross pipe 64 on the frame 18.

As shown in FIG. 2, the guide rods 60 extend below the idlers 44 and 46 and then upwardly in a direction parallel to the guide track 58 for the endless chain conveyor. At their upper forward ends, the guide rods project forwardly to free ends 66.

Cooperating with guide rods 60 is a flow pan 70 which forms the forward side of passage P. Pan 70 extends vertically as shown in FIG. 2. It is pivotally supported at 71 adjacent an upper discharge end 74 of the pan. Pan 70 is biased by spring 72 toward rods 60. The flow pan has a component of movement toward and away from the rods. Further, the rods 60 have some flexibility to move relative to the extension of flow pan 70. The width of passage P can expand responsive to an increase in the quantity or density of the material being picked up and elevated, or contract when a lesser volume of material is being handled. Also, at the upper end of passage P, a flexible chamber results to receive the crop material.

At the lower edge of flow pan 70 is a flap 73 made of plastic, canvas or other flexible material to provide a curved surface leading into passage P. As machine 15 travels forwardly, flap 73 presses the crop in window W downwardly and the tines 48 sweep the crop upwardly into the passage P between guide rods 60 and flow pan 70. The crop material is first elevated through passage P and then directed forwardly by the upper ends 66 of rods 60. As the tines 48 travel along the track 58, the tines withdraw from the crop material as they travel toward the forward sprockets 54. In this way, the forward ends 66 of the rods cause the crop material to be stripped from tines 48 and discharged forwardly over the upper edge 74 of the flow pan 70.

When the windrowed crop is picked up and elevated, the damp rearward side 10 of the windrow travels along the guide rods 60 and the dry forward side 12 travels along flow pan 70. At the upper end of passage P when the windrow is discharged forwardly, the crop material is inverted so that the dry side 12 is now down and the damp side 10 is up.

To maintain the windrowed crop in inverted position, and to convey the inverted material laterally for discharge from the machine, a triangularly-shaped conversion chute 75 is provided. This chute has an upper end along the right side of the machine traveling forwardly. The chute 75 terminates in a diagonal discharge edge 78 positioned over a cross conveyor 80.

The conversion chute is of smooth plastic or sheet metal slanting downwardly from the right to the left of the machine. The diagonal displacement of the chute and its discharge edge 78 is about thirty degrees relative to the extension of pick up conveyor 40. Therefore, as the inverted crop travels from the pick up conveyor and is discharged forwardly, it is directed laterally a second twenty-five to thirty-five degrees, whereby the inverted crop now is approximately sixty degrees relative to the extension of the windrow W resting on the ground G.

As the crop slides down conversion chute 75, it is deposited on cross conveyor 80. Cross conveyor 80 has an endless belt 82 provided with outwardly projecting ribs 84. The belt 82 travels over guide rollers 86 at opposite sides of the machine. The path of travel of the endless conveyor is parallel to the diagonal extension of the pick up conveyor 40. As the crop material comes from the conversion chute 75, it slides onto the top of transverse cross conveyor 80.

The upstanding ribs 84 on the upper reach 82 of the cross conveyor causes the crop to be moved laterally toward the left side of the machine and rearwardly for discharge over frame edge 88, so that the crop material may drop back onto the ground. As shown in FIG. 1, guides 90 are provided to further direct the crop rearwardly to complete the ninety degree transition of the windrow from its original position on the ground until the windrow W' is deposited inverted back on the ground and laterally displaced from its original location W.

The operative components of the machine are driven from the power-take-off 91 of the tractor T. A drive train 92 is provided back to a chain drive 94. The chain drive provides power for the transverse cross conveyor 80. Also, power is transmitted to chain 95 which drives a gear box 96. The upper forward sprockets 54 are driven from gear box 96 to provide a drive for pick up conveyor 40. Sprocket sizes and gear ratios are used to provide the operative components with desired speeds.

As shown by the windrow arrows 98, as the crop inverter machine travels forwardly being pulled by the tractor T, the tines 48 sweep horizontally along the ground and then upwardly to move the windrowed material in a vertical direction through the passage P between the guide rods 60 and the flow pan 70. Because of its diagonal extension, the tines sweep the ground clean and at the same time orient the elevated crop about thirty degrees relative to the direction of travel.

As the crop moves upwardly through the passage P of the machine it is directed by the upper ends 66 of the guide rods 60 for discharge forwardly. As it is directed forwardly, the crop becomes inverted with the dry side 12 now located downwardly and the damp side 10 on the upper portion of the stream.

As the windrow is discharged from the pick up conveyor 42, it lands on the diagonal conversion chute 75 and is directed laterally towards the left side of the machine. The location of the chute and its diagonal extension causes the crop to move about another thirty degrees beyond that provided by the pick up whereby the crop is now oriented approximately sixty degrees relative to the direction of travel when it lands in inverted position on the cross conveyor 80.

When the crop stream engages the upper surface of the cross conveyor 80, the ribs 82 facilitate movement of the crop laterally for discharge over the diagonal edge 88 of the machine frame. Guides 90 engage part of the stream and as the crop leaves the machine, and responsive to the forward direction of travel, the material is deposited back on the ground with the damp side up and the dry side down. Further, the windrowed crop is laterally displaced relative to its original position on the ground.

With the structure described, the hay is gently picked up, elevated and controlled in its passage back onto the ground. Each successive step in its movement, causes the crop material to be angled laterally toward the left side of the machine whereby it is deposited back onto the ground directly adjacent the side of the machine and in inverted condition.

With this design, the pick up conveyor 40 and cross conveyor 80 have generally the same operative width whereby the overall width of the machine is limited so that it can pass between gate posts and the like in travel of the machine to the field. Further, when the crop is discharged in inverted position back onto the field, it lands on the ground adjacent the wheel 22 and generally within the lateral operative width of the machine.

As will be noted from FIG. 1, the ground wheels 22 and 24 rotate on transverse axes which are parallel to each other each. However, wheel 24 is forwardly of wheel 22. Both wheels are close to the diagonal extension of the pick up conveyor 40. Because of this wheel location, the machine responds to ground variations to properly locate the tines 48 as they travel to pick up and engage the crop material on the ground.

With inverter machine 15, the crop is handled in a controlled manner in the inversion process and in the conveyance of the crop back onto the ground. Less leaves are lost in the harvesting process. As the crop lands back onto the ground, a light fluffy uniform windrow is provided. This enables better harvesting in later operations.

Although this inverter machine has been described in relation to picking up and inverting a windrow, it will be understood that the machine can also be used to handle crop material which has been left on the field in a swath. The diagonal extension of the pick up conveyor will readily pick up a swath and convey it through the passage P for inversion the same as the handling of a windrow.

In machine 15, pick up conveyor 40 provides the first component of diagonal movement of the crop. Transition chute 75 provides the next component of movement and cross conveyor 80 moves the material laterally for engagement with the guide rods 90 along the side of the machine and deposit of the crop on the ground along side the unit. This step-by-step diagonal and rearward displacement provides for more gentle handling and within a machine width which is desirable and operative over a narrower space than other inverter machines of prior design.

Although a specific configuration of the inverter machine is shown, it will be understood that the invention is subject to modification without departing from the concept disclosed.

Having thus described our invention, what we claim is:

1. A hay harvesting machine for picking up previously cut crop material in a windrow or swath on the ground, inverting the crop to position a damp side up and a dry side down and then conveying the inverted crop toward one side of the machine and depositing the crop back on the ground laterally displaced from its original position while maintaining said damp side up, comprising:
   a frame moveable in a forward direction of travel over the crop material on the ground;
   wheels supporting said frame;
   pick up conveyor means carried on a rearward portion of said frame having elements which engage and elevate the crop from the ground, invert the crop during elevation and discharge the inverted material forwardly toward a forward portion of the frame;
   cross conveyor means carried on said forward portion of said frame and positioned to receive the inverted crop from said pick up conveyor means and direct the crop laterally at an angle relative to said forward direction of travel;
   said pick up conveyor means and said cross conveyor means being coextensive transversely relative to said frame travel and both of said means having generally the same operative width.

2. A hay harvesting machine as recited in claim 1 wherein said pick up conveyor means is positioned diagonally relative to said forward direction of travel whereby when the crop material is elevated from the ground, inverted and discharged forwardly, the crop is simultaneously directed toward said one side of said machine and rearwardly to facilitate deposit of the crop on the ground.

3. A hay harvesting machine as recited in claim 1 wherein said cross conveyor means is positioned diagonally relative to said forward direction of travel whereby when the inverted crop material is received from said pick up conveyor means the crop is directed toward said one side of said machine and rearwardly to facilitate deposit of the crop on the ground.

4. A hay harvesting machine as recited in claim 1 wherein said pick up conveyor means is positioned diagonally at an angle in the range of 25° to 35 degrees relative to said forward direction of travel of the machine, said cross conveyor means being positioned diagonally at an angle relative to said forward direction of travel and also diagonally at an angle in the range of 25° to 35 degrees relative to said pick up conveyor means, whereby said pick up conveyor means and said cross conveyor means together turn the crop material in the range of 50° to 70 degrees as the crop is directed toward said one side of said machine and rearwardly to facilitate deposit of the crop on the ground.

5. A hay harvesting machine as recited in claim 1 wherein said pick up conveyor means comprises an endless chain conveyor having crop engaging tines thereon, and drive means for the pick up conveyor means to move said tines downwardly into the crop material, then forwardly to lift the crop off of the ground, then upwardly to provide a clean pick up as the harvester travels forwardly.

6. A hay harvesting machine as recited in claim 5 wherein said endless chain travels over double idlers adjacent the ground rotatable about transverse axes and so located that said tines have a horizontal and forward component of movement along the ground as the crop material is engaged and picked up, said drive means moving said tines faster than the speed of travel of said frame over said crop material.

7. A hay harvesting machine as recited in claim 5 wherein said pick up conveyor means has a vertically extending section which elevates the crop and a forwardly projecting section which causes the crop to be inverted and discharged toward said direction of travel and onto said cross conveyor means.

8. A hay harvesting machine as recited in claim 7 wherein said pick up conveyor means includes hay guards which guide the crop as it is being elevated and inverted and directs the inverted crop damp side up as the crop travels onto said cross conveyor means.

9. A hay harvesting machine as recited in claim 8 wherein said pick up conveyor includes a flow pan which defines a passage with said hay guards through which the crop material flows during transit onto said cross conveyor means.

10. A hay harvesting machine as recited in claim 9 wherein spring means is provided to support said flow pan for movement fore and aft toward and away from the crop material being elevated and inverted to accommodate various densities of crop.

11. A hay harvesting machine as recited in claim 10 wherein said flow pan extends vertically, means mounting on upper end of said flow pan for pivotal movement about a transverse axis, said spring means engaging a lower end of the flow pan and controlling pivotal movement about said axis.

12. A hay harvesting machine as recited in claim 8 wherein said hay guards are spaced from each other and between which said pick up tines extend, said guards being so located relative to the path of travel of the tines that crop material is stripped from the tines as the crop travels forwardly and is discharged onto said cross conveyor.

13. A hay harvesting machine as recited in claim 12 wherein said hay guards are so positioned relative to said pick up conveyor means and said cross conveyor means that a flexible chamber is formed to receive elevated and inverted crop material.

14. A hay harvesting machine as recited in claim 9 wherein a curved flap is provided forwardly of said passage adjacent a lower end of said flow pan to assist in guiding crop material into the passage.

15. A hay harvesting machine as recited in claim 1 wherein said cross conveyor means includes a conversion chute for receiving picked up and inverted crop material, said chute having a discharge edge which extends diagonally relative to the direction of movement of crop material as the crop comes from said pick up conveyor means.

16. A hay harvesting machine as recited in claim 15 wherein said cross conveyor means has an endless apron beneath said chute onto which the inverted crop material is guided by said chute and deposited on the apron, said apron having an upper reach travelling transversely toward said one side of said machine over rolls extending diagonally fore and aft relative to the direction of travel of the harvester.

17. A hay harvesting machine as recited in claim 14 wherein said chute overlies only a portion of said apron and the chute extending on an incline from a higher end along one side of the machine to a lower and toward said one side of the harvester to direct inverted crop material deposited thereon laterally.

18. A hay harvesting machine as recited in claim 16 wherein said apron has ribs which travel along said upper reach and toward said one side of the machine to convey crop material laterally for discharge onto the ground.

19. A hay harvesting machine as recited in claim 1 wherein guide means is provided to receive crop material discharged from said cross conveyor means and direct the crop material onto the ground while maintaining the crop damp side up.

20. A hay harvesting machine as recited in claim 19 wherein said guide means comprises side by side laterally extending rods which project laterally and then rearwardly.

21. A hay harvesting machine as recited in claim 2 wherein said wheels which support said frame comprise a first wheel located along the side of said frame adjacent said one side of the machine and a second wheel along the side of the frame opposite said one side of the machine, both wheels being rearwardly of said pick up conveyor means and generally equidistant therefrom for rotation respectively about different transverse axes, the axis of said first wheel being rearwardly of the axis of said second wheel.

22. A hay harvesting machine for picking up previously cut crop material in a swath or windrow on the ground, inverting the crop to position a damp side up and a dry side down and then conveying the inverted crop toward one side of the machine and depositing the crop back on the ground laterally displaced from its original position while maintaining said damp side up comprising;

a frame moveable over the ground in a forward direction of travel;

pick up conveyor means carried on a rearward position of said frame and having an endless chain conveyor provided with tines to engage the crop material on the ground;

drive means for the pick up conveyor means to move said tines downwardly into the crop material, thus forwardly and then upwardly;

said endless chain conveyor traveling over including double idlers adjacent the ground so that said tines have a forward horizontal component of movement along the ground as the crop is engaged and picked up;

said pick up conveyor means having a forward flow pan and rearward hay guards which extend upwardly from adjacent the ground and then forwardly toward a hay discharge location;

said flow pan and hay guards defining a passage and being cooperative to guide the crop material upwardly and then forwardly as the crop is elevated by said tines;

said endless chain having an upper forwardly projecting section which with said flow pan and hay guards define a chamber for receiving inverted crop material;

an endless cross conveyor mounted on said frame on a forward portion thereof to receive elevated and inverted crop material and move the crop transversely relative to the direction of travel of the machine toward said one side of the machine;

a chute above a portion of said cross conveyor to direct the crop material laterally as it comes from said pick up conveyor;

said chute having a diagonal discharge edge above said endless cross conveyor;

said pick up conveyor means and said cross conveyor being generally coextensive and of similar operative width; and discharge guide rods to receive crop material from said cross conveyor and deposit it on the ground while maintaining the crop inverted, damp side up.

23. A method of harvesting previously cut hay laying on the ground in a swath or windrow with a dry side up and a damp side down comprising;

traveling in a forward direction over the hay;

moving tines downwardly, forwardly and then upwardly at a speed faster than ground speed to engage and pick the hay off of the ground;

elevating the picked up hay with the dry side facing forwardly and the damp side rearwardly;

directing the elevated hay forwardly to invert the hay with the dry side down and the damp side up;

engaging the hay as it is being directed forwardly and turning the hay at an angle to one side and rearwardly while maintaining said damp side up;

then, as the hay is moving laterally and rearwardly at an angle discharging the hay back onto the ground along side the original position of the hay on the ground while maintaining the damp side up.

* * * * *